United States Patent [19]

Goossen

[11] Patent Number: 5,698,452
[45] Date of Patent: Dec. 16, 1997

[54] METHOD OF MAKING INTEGRATED DETECTOR/PHOTOEMITTER WITH NON-IMAGING DIRECTOR

[75] Inventor: Keith Wayne Goossen, Aberdeen, N.J.

[73] Assignee: Lucent Technologies Inc., Murray Hill, N.J.

[21] Appl. No.: 524,142

[22] Filed: Aug. 31, 1995

Related U.S. Application Data

[62] Division of Ser. No. 232,889, Apr. 25, 1994, abandoned.
[51] Int. Cl.$^6$ .................................................. H01L 31/18
[52] U.S. Cl. ...................... 437/2; 437/209; 148/DIG. 135
[58] Field of Search .............................. 257/98, 432, 436; 437/2, 5, 133, 209, 966, 974; 148/DIG. 135

[56] References Cited

U.S. PATENT DOCUMENTS

| | | | |
|---|---|---|---|
| 3,443,140 | 5/1969 | Ing et al. ................................... | 257/98 |
| 4,143,394 | 3/1979 | Schöberl ..................................... | 257/98 |
| 4,626,322 | 12/1986 | Switzer ......................................... | 437/2 |
| 5,023,685 | 6/1991 | Bethea ........................................ | 257/21 |
| 5,124,281 | 6/1992 | Ackerman et al. ..................... | 437/209 |
| 5,418,183 | 5/1995 | Joyner et al. ............................ | 437/133 |

FOREIGN PATENT DOCUMENTS

| | | | |
|---|---|---|---|
| 63-291466 | 11/1988 | Japan ................................. | 257/432 |
| 63-308831 | 12/1988 | Japan ................................. | 257/432 |
| 2105585 | 4/1990 | Japan ................................. | 257/432 |
| 3152978 | 6/1991 | Japan ................................. | 257/432 |

OTHER PUBLICATIONS

Shaw, "Localized GaAs Etching with Acidic Hydrogen Peroxide Solutions," J. Electrochem. Soc., V128(4), pp. 874–880 (1981).

*Primary Examiner*—Chandra Chaudhari

[57] ABSTRACT

A method and apparatus are disclosed for an integrated photonic device. A transparent non-imaging optical director having a top and a bottom surface is integrated, at its bottom surface, with a photonic device. The bottom surface is approximately equal in area to the active area of the photonic device. The top surface of the director is larger than its bottom surface. The top and bottom surface are connected by a waveguiding region. The geometry and refractive index of the non-imaging optical director are controlled so that the light entering the director is preferably totally internally reflected. Substantially all optical energy of an optical signal received at the top surface of the non-imaging optical director will be directed to its bottom surface, and then to the integrated photonic device. Where the photonic device is an optical source, substantially all optical energy emitted that is received by the bottom surface is directed to the top surface.

20 Claims, 6 Drawing Sheets

METHOD OF MAKING INTEGRATED DETECTOR/PHOTOEMITTER WITH NON-IMAGING DIRECTOR

This is a divisional of application Ser. No. 08/232,889 filed on Apr. 25, 1994, abandoned.

FIELD OF THE INVENTION

This invention relates to non-imaging optical directors, and particularly to integrating non-imaging optical directors with photonic devices.

BACKGROUND OF THE INVENTION

In free-space optical interconnections between integrated circuit (IC) chips, wherein arrays of optical beams are imaged onto arrays of detectors, it is difficult to obtain optical spots as small as the active area of a detector. Thus, the detector area must be increased due to the limitations of the optical system. An increase in the size of the detector is accompanied by a higher capacitance and lower detector speed, thus degrading system performance.

SUMMARY OF THE INVENTION

A method and apparatus are disclosed for an integrated photonic device. A transparent non-imaging optical director having a top and a bottom surface is integrated, at its bottom surface, with a photonic device. The bottom surface is approximately equal in area to the active area of the photonic device. The top surface of the director is larger than its bottom surface. The top and bottom surface are connected by a waveguiding region. The geometry and refractive index of the non-imaging optical director are controlled so that the light entering the director is preferably totally internally reflected.

An optical signal may initially be received at the top or the bottom surface of the director depending upon the application and the specific photonic device with which the non-imaging optical director is integrated. Where the photonic device is a detector, an optical signal is imaged on the top surface of the non-imaging optical director. The waveguiding region then directs the optical signal to the director's bottom surface, and then to the photonic device. Thus, the non-imaging optical director captures, and delivers to the detector, a greater portion of the optical energy of the optical signal than would otherwise be received, assuming the optical spot is significantly larger than the detector. Thus, the detector is effectively enlarged without the drawbacks of actual enlargement.

Where the photonic device is a light source, i.e., a photoemitter, an optical signal is received at the bottom surface of the director and the waveguiding region directs the signal to the top surface of the director. A plurality of such integrated photoemitters may be used to form an improved display.

BRIEF DESCRIPTION OF THE DRAWINGS

Further features of the invention will become more apparent from the following detailed description of specific embodiments thereof when read in conjunction with the accompanying drawings, in which like elements have like reference numerals and in which:

FIG. 2b is a plan view of the device of FIG. 2a;

DETAILED DESCRIPTION OF THE INVENTION

Figure 1:
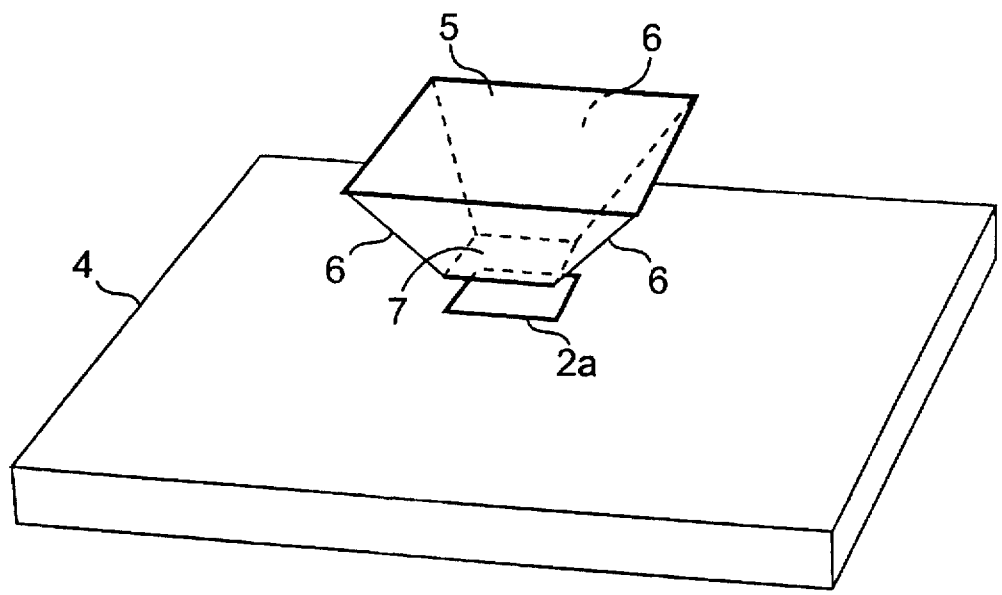
FIG. 1 is an exploded view of a non-imaging optical director and photonic device integrated to form a device according to the present invention.

FIGS. 1–4 illustrate a non-imaging optical director (NID) 1 and a photonic device 2, such as a detector or an emitter, integrated to form an integrated photonic device 3 embodying the invention. FIG. 1 is an exploded view of the integrated photonic device 3. It should be understood that the bottom surface 7 of the NID 1 and the active surface 2a of the photonic device are in abutting relation, i.e., there is no physical separation between these surfaces. While a single device 3 formed on a chip 4 is shown in FIG. 1, a plurality of such devices may be formed on a chip.

The NID 1 must be transparent to light at the operating frequency of the photonic device 2 with which it is integrated. The NID 1 may be formed from any transparent material capable of being shaped as described below. Where the photonic device is gallium arsenide (GaAs) based, the NID 1 is preferably formed of aluminum gallium arsenide (AlGaAs).

As shown in the Figures, the area of a top surface 5 of the NID 1 is greater than the area of its bottom surface 7. The area of the bottom surface 7 of the NID 1 is approximately equal to the area of the active surface 2a of the photonic device 2 with which it is integrated. The sidewalls 6 of the NID 1 are sloped or tapered.

Figure 2A:
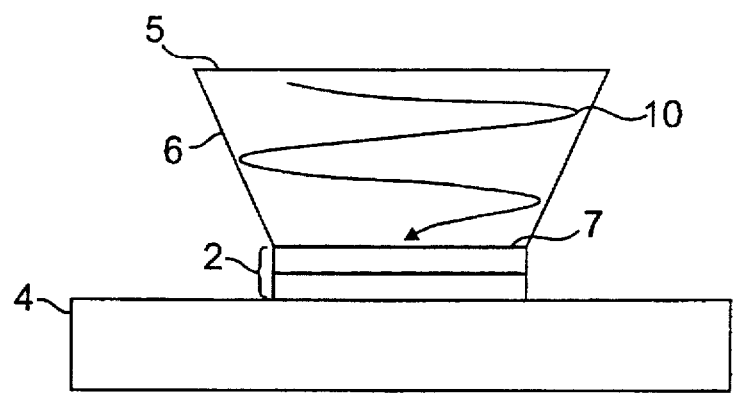
FIG. 2a shows an integrated photonic device according to the present invention where the photonic device is a photodetector.
Figure 2B:
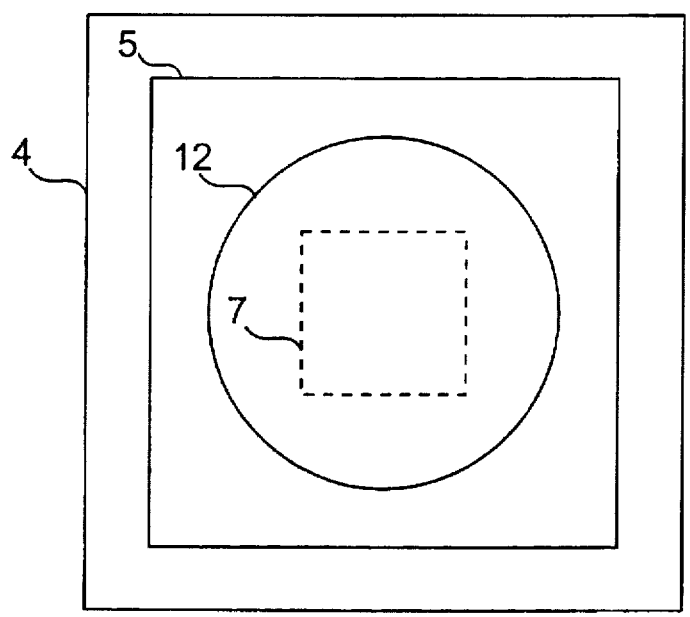
Figure 2C:
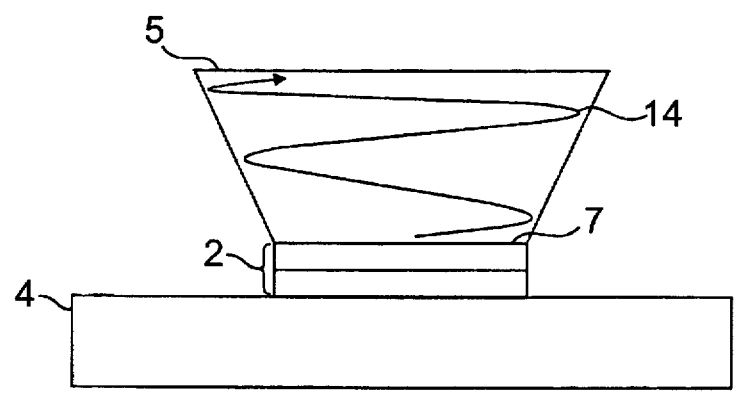
FIG. 2c shows an integrated photonic device according to the present invention where the photonic device is a photoemitter.
Figure 3:
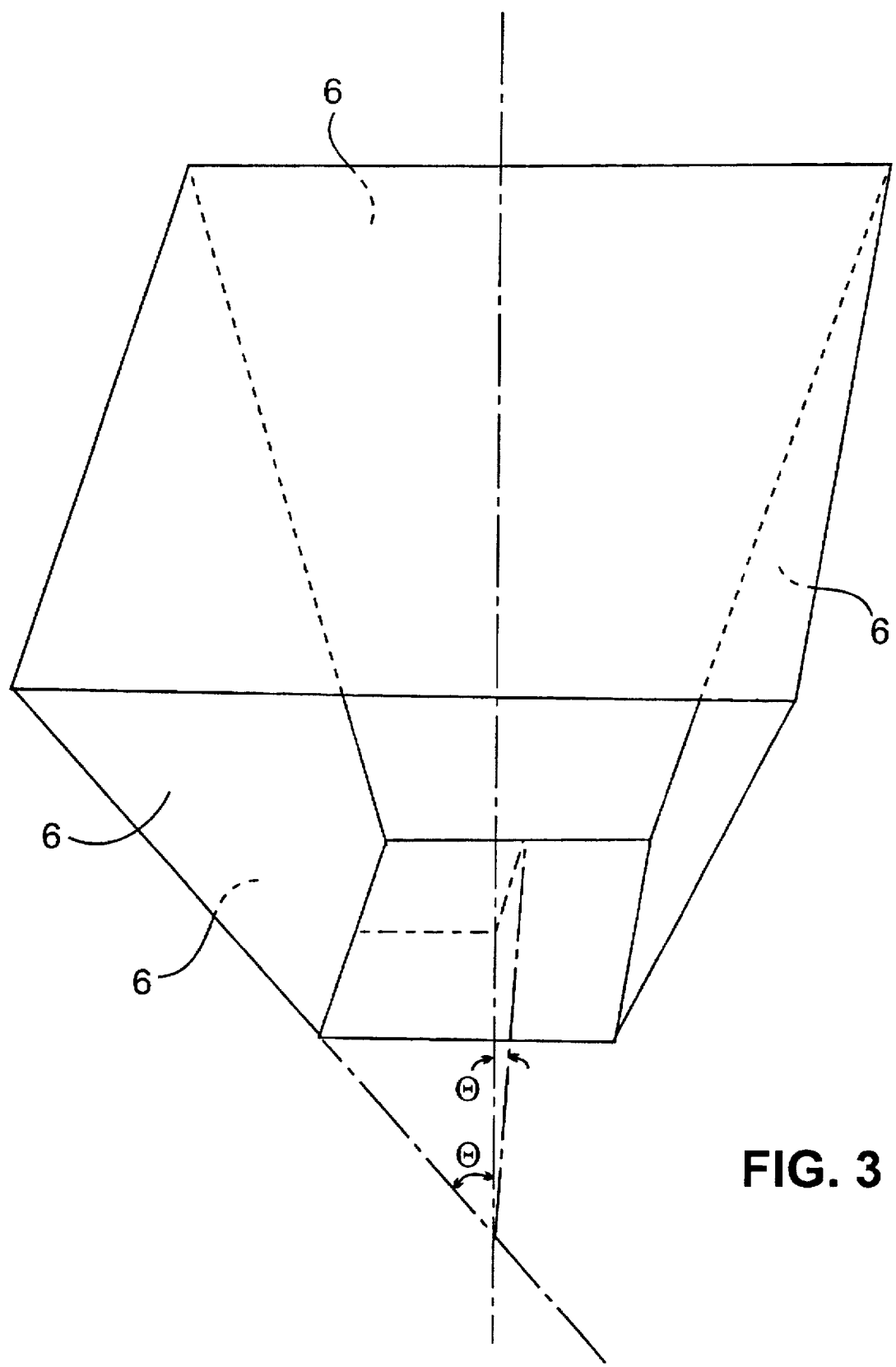
FIG. 3 is a perspective view of the non-imaging optical director.

An optical source 8, which produces an optical signal 10, is shown in FIG. 2a. In this embodiment, the photonic device is a detector, such as a multiple quantum well (MQW) photodiode. The optical signal 10 is imaged onto the top surface 5 of the NID 1, resulting in an optical spot 12, shown in FIG. 2b. As will be discussed below, the top surface 5 is preferably sized so that its total surface area is close to the area of the optical spot 12. The taper of the sidewalls 6 of the NID 1 direct the optical signal received at the top surface 5 to the bottom surface 7 and then to the active surface 2a of the photonic device 2, in this case a photodetector. Thus, the NID 1 functions as an optical concentrator.

In another embodiment, shown in FIG. 2a, the photonic device 2 is a photoemitter, i.e., an optical source. An optical signal 14 is produced by the photonic device 2 and received at the bottom surface 7 of the NID 1. The taper of the sidewalls 6 direct the optical signal to the top surface 5. For this embodiment, the NID 1 functions as a diffuser.

The geometry and refractive index of the NID 1 are controlled so that most of the optical energy entering the NID 1 is internally reflected to the surface opposite the surface at which the light was received. In a preferred embodiment, substantially all optical energy is so reflected. In particular, the taper angle θ of the sidewalls 6, and the refractive index of the material comprising the NID are tailored to obtain internal reflection. Typically, the taper angle θ of the sidewalls 6, as shown in FIG. 4, is about 20° to 35° to achieve such internal reflection.

It is desirable to minimize the height of the NID 1, i.e., the distance from the top surface 5 to the bottom surface 7. It is also desirable for the area of the top surface 5 of the NID 1 to be close to the size of the optical spot. Thus, the specific geometry of the NID 1 is dependent upon which of the various interrelated parameters such as the size of the top surface 5, the taper angle θ, the refractive index or the height of the NID 1 control the design. Further, the shape of the NID 1 is dependent upon the manner in which the NID is etched. The top surface 5 may have a circular shape, the body of the NID being the frustrum of a cone, or the top surface 5 may have a rectangular shape, giving the body of the NID a shape as shown in FIG. 4. The shape of the NID is only limited by the ability to etch a given shape.

Figure 4:
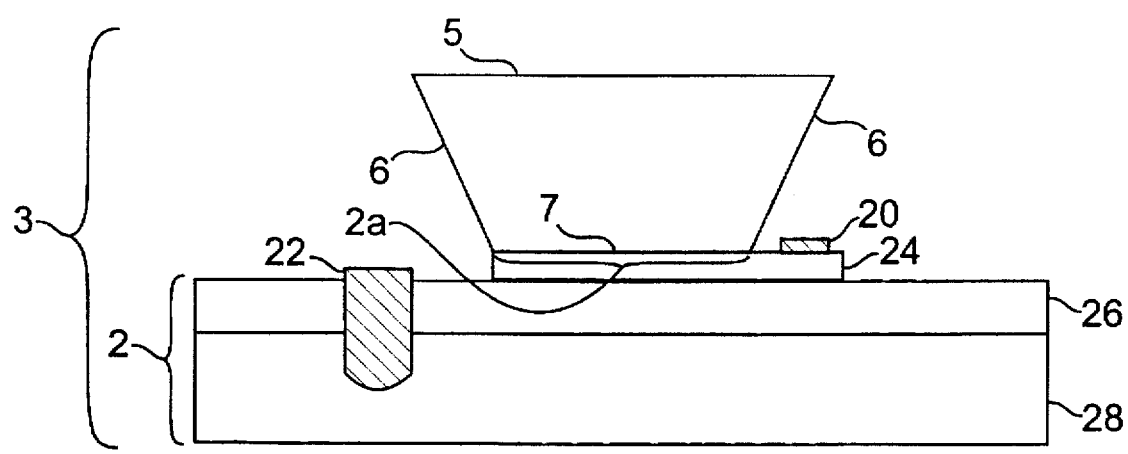
FIG. 4 is a side view of the device of FIG. 1 showing further detail of the photonic device.

It should therefore be understood that FIGS. 1 and 4 are intended to illustrate the general features of the NID, and are not intended as a limitation as to the structure of the NID. The NID 1 will have a physical structure dictated by how one chooses to balance the aforementioned considerations, and will vary depending on the physical constraints of a particular system.

A side view of the integrated photonic device 3 of the present invention is shown in FIG. 4, including further detail of the photonic device 2. The particular structure depicted in FIG. 4 as the photonic device 2 is a photodiode. The photodiode includes an n electrode 20, p electrode 22, n-doped semiconductor 24, p-doped semiconductor 28 and undoped semiconductor 26. As previously noted, the photonic device 2 may also be a photoemitter. The structures of photodiodes and photoemitters are well known to those skilled in the art.

The device 3 may be formed by using conventional etching techniques and bonding methods, as well as a method for substrate removal described in Ser. No. 08/083, 742, now U.S. Pat. No. 5,385,632, entitled "Integrated Semiconductor Devices and Method For Manufacture Thereof," filed Jun. 25, 1993, the disclosure of which, along with all other references cited in this specification, are incorporated by reference herein in their entirety.

Figure 5A:
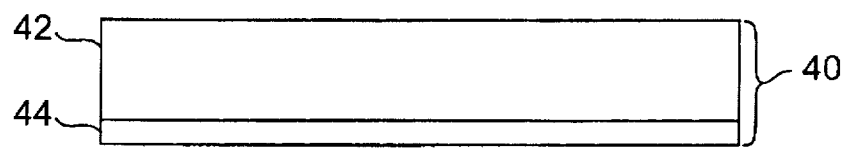
FIGS. 5a–5g illustrate a method of fabricating the device shown in FIG. 1.

The above methods, as applied to a first embodiment of the present invention, are illustrated in FIGS. 5a–5g. These Figures illustrate the fabrication of a plurality of integrated photonic devices 3 according to the present invention. As shown in FIG. 5a, an optical chip 40, comprising a substrate 42 and a stop-etch layer 44 is prepared. The substrate 42 is typically GaAs. The stop-etch layer 44, which will ultimately form the NID 1, is preferably formed of AlGaAs where the photonic device which will be integrated with the NID is GaAs based, as previously noted.

Figure 5B:
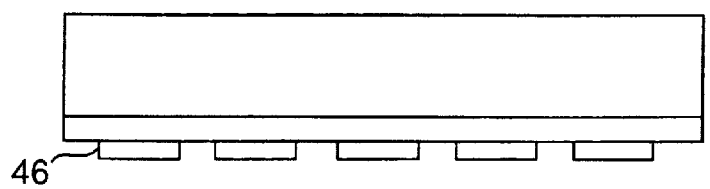
Figure 5C:
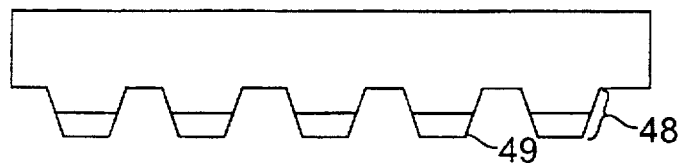

In the first step, shown in FIG. 5b, photoresist 46 is deposited on the stop-etch layer 44 at the locations at which mesas 48 will be formed. Mesa location is dictated by the positions of the photonic devices 2 with which the NIDs 1 are to be integrated. An etchant, such as $H_2O_2/H_3PO_4/H_2O$ is used to etch the mesas 48 in the stop etch layer 44. The etch should be carried out so that the mesa will have a sloping sidewall 49 as shown in FIG. 5c. The slope of sidewall is dictated by the above noted considerations. It is well known in the art how to control the etch in this manner. See Shaw, "Localized GaAs Etching with Acidic Hydrogen Peroxide Solutions," J. Electrochem. Soc., V.128(4), p. 874–81 (1981). The choice of an appropriate material for the NID 1 may be based, in part, on the ability of an available etchant to yield the desired taper. The etch proceeds into the substrate 42 of the optical chip 40. Following the etch, the photoresist 46 is removed.

Figure 5D:
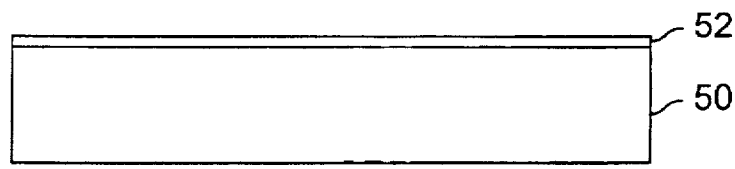
Figure 5E:
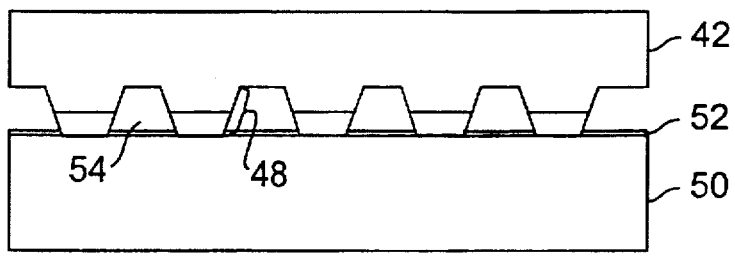
Figure 5F:
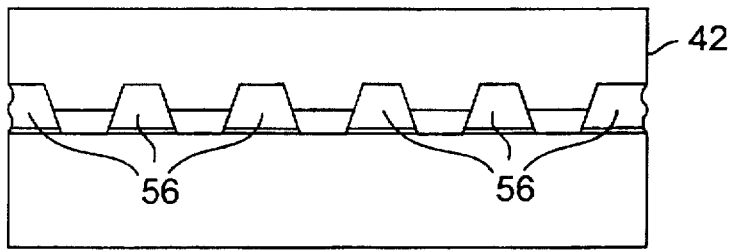

Next, the mesas 48 of optical chip 40 are bonded to a plurality of photonic devices 2 on a photonic device chip 50. A transparent material suitable for bonding the mesas 48 to the photonic devices 2, such as a transparent epoxy, is applied as a thin film 52 to the photonic device chip 50, as shown in FIG. 5d. Next, the mesas 48 of the optical chip 40 are aligned with the photonic devices 2 of the photonic device chip 50. The mesas 48 are then brought in contact with the epoxy layer 52 on the photonic device chip 50, causing the mesas 48 to bond to the photonic devices 2, as shown in FIG. 5e. The bonding material should have a low index of refraction so that total internal reflection of the optical signal in the NID 1 is maintained. Following bonding of the mesas 48 to the photonic devices 2, the substrate 42 of the optical chip 40 must be removed. Substrate removal ancillary to chip bonding is described in U.S. Pat. No. 5,385,632. The method comprises flowing a flowable hardener 56 between the optical chip 40 and the photonic device chip 50 by depositing drops of the flowable hardener 56 at the edges of the photonic device chip 50. Aided by capillary action, the flowable hardener flows between the spaces 54 formed between the chips. As shown in FIG. 5f, the flowable hardener 56 fills the spaces 54. Suitable flowable hardeners include, without limitation, epoxy, photoresist, such as AZ 4210 photoresist, commercially available from Shipley Co. in Newton, Mass., and any polymer that resists the substrate etch, discussed below, and that dries into a mechanically sound solid corresponding to a photoresist. The flowable hardener 56 is allowed to harden. In the hardened state, the flowable hardener protects the photonic device 2 during substrate etching, and may provide additional mechanical support to the NID/detector bonds.

Figure 5G:
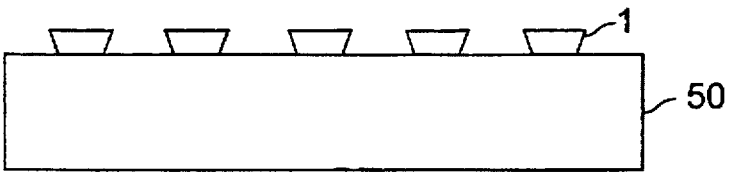

Finally, the substrate 42 is removed, leaving a plurality of NIDs 1 bonded to the photonic devices 2 of the photonic device chip 50, as shown in FIG. 5g. The substrate 42 is chemically removed by a jet etcher wherein typically a 1×1 mm jet of etchant is delivered onto the surface of the substrate 42. Suitable etchant, such as 100:1 $H_2O_2$:$NH_4OH$, will remove the substrate but not etch the NIDs 1.

Some or all of the hardened flowable hardener may remain on the photonic device chip 50. The presence of the hardened flowable hardener 56 on the photonic device chip 50 improves the strength of the integrated photonic device 3. For embodiments which retain the flowable hardener for mechanical support, a suitable flowable hardener is one that becomes sufficiently solid to furnish mechanical support. If flowable hardener 56 remains on the surface of the photonic device chip 50 adjacent to the NID 1, it is important that it does not interfere with the optical properties of the NID. In such a case, the flowable hardener must have a suitably low index of refraction.

Optionally, some or all of the hardened flowable hardener may be removed from the photonic device chip 50. However, epoxy may not be used as the flowable hardener 56 if removal of any portion of the hardener is contemplated. In such a circumstance, photoresist or some other readily removable hardener should be used. Suitable hardeners for embodiments wherein the hardener is removed need not display the same supporting mechanical strength as where the hardener remains on the chip. Solvent may be used to remove the hardened photoresist or other hardener. FIG. 5g shows the integrated photonic devices 3 of the present invention with all flowable hardener removed.

In a second embodiment of the present invention, the photonic device chip, i.e., the chip containing the photonic devices to be integrated with the NIDs, comprises all the layers necessary to form both the photonic devices and the NIDs. Forming the device of the present invention in this manner facilitates integrating the device with a fully-fabricated IC chip, such as Si or even GaAs.

Figure 6:
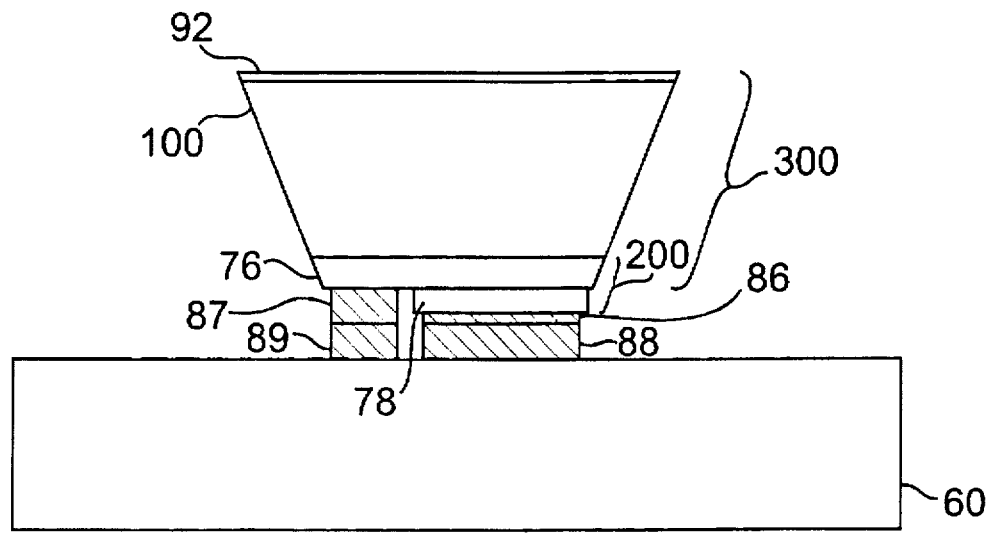
FIG. 6 is a side view of a second embodiment of the present invention wherein the layers necessary for forming a non-imaging optical director and a photonic device are present on a single chip, and shows the present invention bonded to an integrated circuit chip.

FIG. 6 illustrates a device 300 according to the present invention integrated with a host chip 60, such as an IC chip. The integrated photonic device 300 comprises a NID 100 and a photonic device 200. The photonic device 200 is comprised of various layers 76 and 78. Metal contacts 86, 87, 88 and 89 may be used to bond, by melting the contacts, the device 300 to the host chip 60.

Figure 7A:
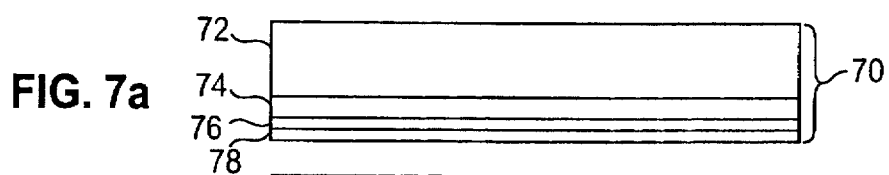
FIGS. 7a–7i illustrate a method of fabricating the device of FIG. 6.

The device 300 is formed as follows. As shown in FIG. 7a, the photonic device chip 70 contains a stop-etch layer 74 from which the NID 100 will be formed, as well as the layers, such as layers 76 and 78, required to form a photonic device 200.

Figure 7B:
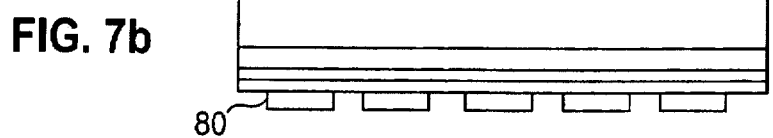
Figure 7C:
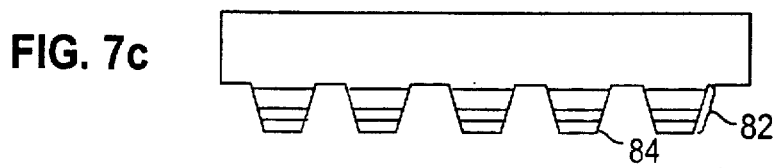

Photoresist 80 is deposited on layer 78 at the locations for mesa formation, as shown in FIG. 7b. Mesas 82 are etched, as in the previous embodiment, to provide a suitably sloped sidewall 84, as illustrated in FIG. 7c. After etching, the photoresist 80 is removed.

Figure 7D:
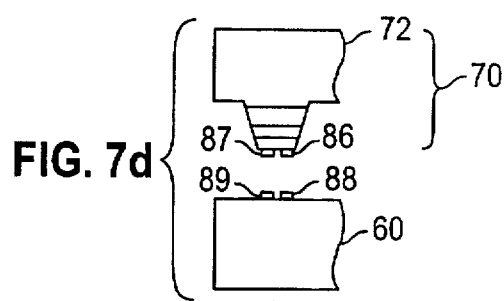
Figure 7F:
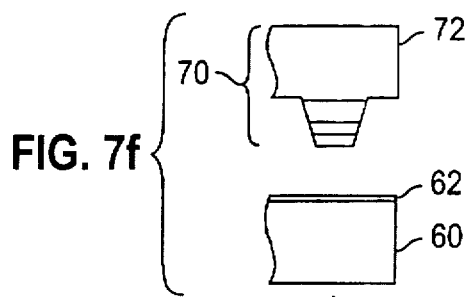
Figure 7E:
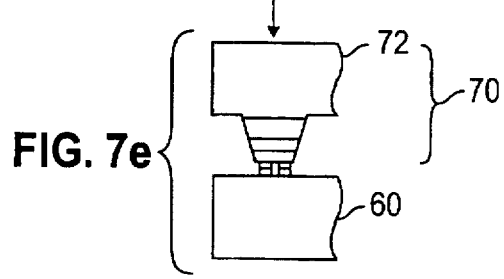

The mesas 82 are then bonded, at the appropriate locations, to a host chip 60. A conductive epoxy or the solder bonding technique described in Ser. No. 08/083,742 may be used to bond the mesas to the host chip. According to the solder bonding method described in Ser. No. 08/083,742 and illustrated in FIGS. 7d & 7e, conductive contacts 88 and 89 are deposited on the host chip 60 at the desired locations. Conductive contacts 86 and 87 are deposited on the bottom of each mesa 82 such that as the photonic device chip 70 is brought into contact with the host chip 60, the conductive contacts 86 and 87 align with conductive contacts 88 and 89, respectively. Heat is applied to melt the conductive contacts into each other, bonding the chips 70 and 60 together, as shown in FIG. 7e. The conductive contacts 86, 87, 88 and 89 are preferably formed from a metal or combination of metals, including, without limitation, gold, gold/zinc or indium.

Figure 7G:
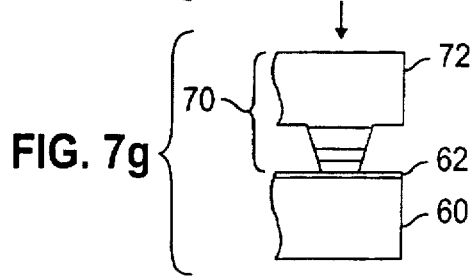

Since the bond is formed between the photonic device and the electronics of an IC chip, the bond must be able to conduct an electrical signal. If epoxy bonding is used for this embodiment, the epoxy must therefore be conductive. For this embodiment, illustrated in FIGS. 7f & 7g, a thin layer of epoxy 62 is applied to the host chip 60. The photonic device chip 70 is aligned and contacted with the host chip, bonding the mesas 82 to the host chip 60.

Figure 7H:
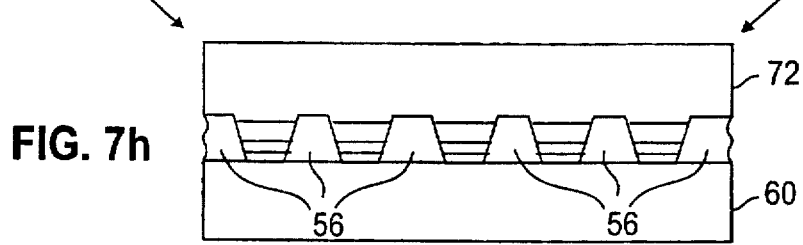
Figure 7I:

As for the previous embodiment, flowable hardener 56 is applied in the spaces between the chips 70 and 60, as shown in FIG. 7h. Once the hardener has hardened, the substrate 72 is removed by jet etching, leaving a plurality of integrated photonic devices 300, each comprising a NID 100 and a photonic device 200, bonded to desired locations on the host chip. As appropriate, solvent is used to remove some or all of the hardened flowable hardener 56 from the surface of the host chip 60. The integrated photonic devices 300 and the host chip 60 are shown with the flowable hardener removed in FIG. 7i.

Figure 8:
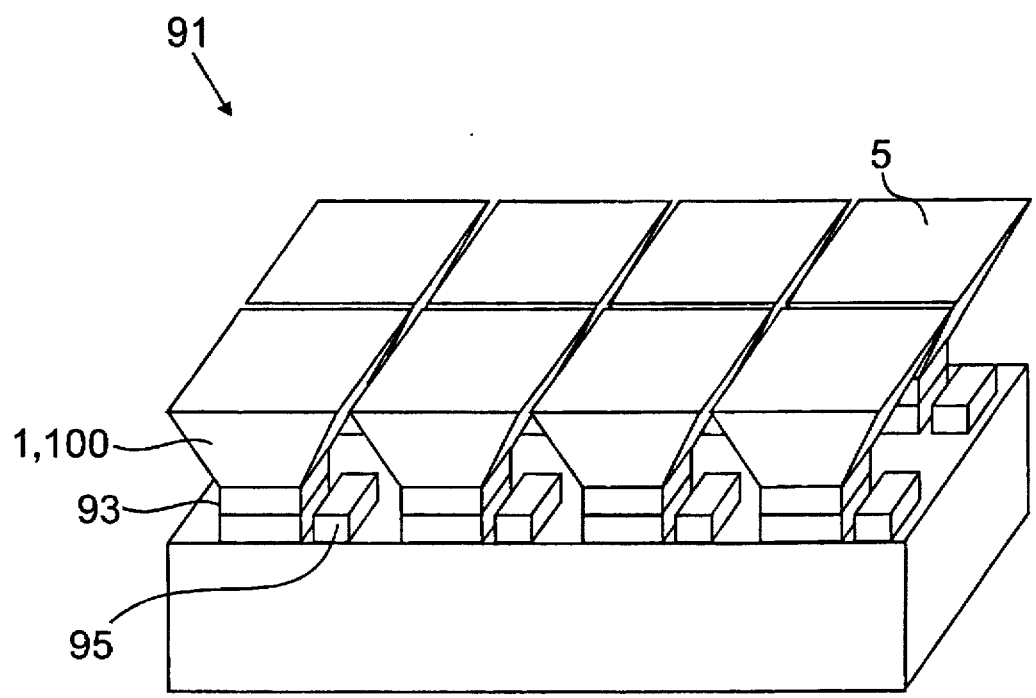
FIG. 8 is a perspective view of an improved display using an plurality of integrated photoemitters according to the invention.

In a further embodiment of the invention, an antireflection (AR) coating 92 may be added to the top surface 5 of the NID 1 or 100 by standard deposition techniques. The AR coating may be comprised of any of a number of suitable materials known to those skilled in the art, such as, without limitation, silicon dioxide or silicon nitride. For a discussion of deposition techniques, see Macleod, *Thin film Optical Filters*, Adam Hilger Ltd., Bristol, U.K. (1986).

Where the NID is integrated with a photodiode to form the integrated photonic device 3 or 300 of the present invention, the device may be used as a detector for photonic switching applications. Where the NID is integrated with a photoemitter to form the device 3 or 300 of the present invention, an array of such devices may be used as a display 91, as shown in FIG. 8. While a display will typically have space between adjacent emitters 93 to allow for drive electronics, a display 91 utilizing the device of the present invention can have nearly a 100 percent filling factor, i.e., substantially no unused space. Integrated NID/Emitters 3, 300 according to the present invention can be formed so that while there is adequate space between the corresponding emitters 93 for drive electronics 95, there will be substantially no space between the top surfaces 5 of adjacent NIDs 1 or 100 forming a display 91.

It should be understood that the structures presented for the photonic device 2 in FIGS. 4 and 6 are intended to be general and should not be considered to be a limitation upon suitable photonic devices. Suitable photonic devices 2, such as photodiodes and photoemitters, may have structures other than those shown in the Figures. All such devices suitable for integration with the NID 1 or 100 are within the contemplated scope of the present invention.

Further, it should be understood that the devices described herein can be formed individually or as part of an array of such devices using the methods of the present invention.

Finally, it should be understood that the embodiments and variations shown and described herein are illustrative of the principles of this invention and that various modifications may occur to, and be implemented by, those skilled in the art without departing from the scope and spirit of the invention.

What is claimed is:

1. A method of making an integrated photonic device comprising the steps of:
   (a) forming a mesa on a first chip having at least a substrate layer and a stop etch layer;
   (b) bonding the mesa on the first chip to a second chip;
   (c) flowing a flowable hardener to fill a space between the first chip and the second chip; and
   (d) removing the substrate from the first chip.

2. The method of claim 1 wherein the step of forming a mesa further comprises the steps of:
   (a) depositing photoresist on the stop etch layer of the first chip at a region where the mesa is to be formed;
   (b) applying an etchant to the first chip at the region where the mesa is to be formed; and
   (c) controlling the etch to achieve a desired taper to the mesa.

3. The method of claim 2 wherein the step of bonding the mesa further comprises the steps of:
   (a) forming a thin layer of bonding material on the second chip;
   (b) aligning the mesa on the first chip with a photonic device on the second chip; and
   (c) contacting the mesa on the first chip with the thin layer of bonding material on the second chip.

4. The method of claim 2 wherein the step of flowing a flowable hardener comprises flowing sufficient hardener so that the hardener, when hardened, forms a structural support from the first chip to the second chip.

5. The method of claim 2 wherein the flowable hardener is selected from the group consisting of epoxy and photoresist.

6. The method of claim 2 wherein the step of removing the substrate comprises leaving enough flowable hardener to enhance the structural support of the integrated photonic device.

7. The method of claim 2 wherein the step of removing the substrate comprises removing all flowable hardener.

8. The method of claim 1 further comprising the step of depositing an anti-reflection coating onto a non-imaging optical director formed when the substrate is removed.

9. The method of claim 1 wherein the step of forming a mesa further comprises the steps of:
   (a) depositing photoresist on the first chip at a region where the mesa is to be formed, the first chip further comprising all layers required for forming a photonic device;
   (b) applying an etchant to the first chip at the region where the mesa is to be formed; and
   (c) controlling the etch to achieve a desired taper to the mesa.

10. The method of claim 9 wherein the step of bonding the mesa comprises the steps of:
   (a) forming conductive contact surfaces on the mesa and on the second chip, wherein the second chip is an integrated circuit chip; and
   (b) heating the contacts so that they melt into each other forming a bond on solidification.

11. The method of claim 10 where the contact surfaces are selected from the group consisting of metal and a combination of metals.

12. The method of claim 9 wherein the step of flowing a flowable hardener comprises flowing sufficient hardener so that the hardener, when hardened, forms a structural support from the first chip to the second chip.

13. The method of claim 9 wherein the flowable hardener is selected from the group consisting of epoxy and photoresist.

14. The method of claim 9 wherein the step of removing the substrate comprises leaving enough flowable hardener to enhance the structural support of the integrated photonic device.

15. The method of claim 9 wherein the step of removing the substrate comprising removing all flowable hardener.

16. The method of claim 9 wherein the step of bonding the mesa comprises the steps of:
   (a) forming a thin layer of conductive epoxy on the second chip, which is an integrated circuit chip;
   (b) aligning the mesa on the first chip with a particular location on the second chip; and
   (c) contacting the mesa on the first chip with the thin layer of conductive epoxy on the second chip.

17. The method of claim 16 wherein the step of flowing a flowable hardener comprises flowing sufficient hardener so that the hardener, when hardened, forms a structural support from the first chip to the second chip.

18. The method of claim 16 wherein the flowable hardener is selected from the group consisting of epoxy and photoresist.

19. The method of claim 16 wherein the step of removing the substrate comprises leaving enough flowable hardener to enhance the structural support of the integrated photonic device.

20. The method of claim 16 wherein the step of removing the substrate comprising removing all flowable hardener.

* * * * *